(12) United States Patent
Bar-Shalev

(10) Patent No.: US 8,977,026 B2
(45) Date of Patent: Mar. 10, 2015

(54) METHODS AND SYSTEMS FOR LOCATING A REGION OF INTEREST IN AN OBJECT

(75) Inventor: Avi Bar-Shalev, Kiryet-Haim (IL)

(73) Assignee: General Electric Company, Schenectady, NY (US)

( * ) Notice: Subject to any disclaimer, the term of this patent is extended or adjusted under 35 U.S.C. 154(b) by 294 days.

(21) Appl. No.: 13/483,448

(22) Filed: May 30, 2012

(65) Prior Publication Data

US 2013/0322717 A1  Dec. 5, 2013

(51) Int. Cl.
*G06K 9/00* (2006.01)
*G01T 1/166* (2006.01)
*G06T 7/00* (2006.01)

(52) U.S. Cl.
CPC ........... *G06T 7/0044* (2013.01); *G06T 2200/04* (2013.01); *G06T 2207/10081* (2013.01); *G06T 2207/10088* (2013.01); *G06T 2207/10108* (2013.01); *G06T 2207/30061* (2013.01)
USPC ..................................... 382/131; 250/363.04

(58) Field of Classification Search
None
See application file for complete search history.

(56) References Cited

U.S. PATENT DOCUMENTS

| | | | | |
|---|---|---|---|---|
| 5,590,655 | A | * | 1/1997 | Hussman ...................... 600/426 |
| 5,844,241 | A | * | 12/1998 | Liu et al. .................. 250/363.04 |
| 6,008,493 | A | * | 12/1999 | Shao et al. ............... 250/363.04 |
| 6,490,476 | B1 | * | 12/2002 | Townsend et al. ............ 600/427 |
| 6,920,196 | B2 | * | 7/2005 | Ueno et al. ...................... 378/19 |
| 6,956,925 | B1 | * | 10/2005 | Hoffman .......................... 378/4 |
| 7,024,028 | B1 | | 4/2006 | Bar Shalev |
| 7,397,934 | B2 | * | 7/2008 | Bloch et al. .................. 382/128 |
| 7,634,048 | B2 | | 12/2009 | Kojima et al. |
| 8,071,949 | B2 | | 12/2011 | Majewski et al. |
| 8,437,522 | B2 | * | 5/2013 | Zou et al. ...................... 382/128 |
| 8,457,377 | B2 | * | 6/2013 | Weiss ............................. 382/128 |
| 8,648,176 | B2 | * | 2/2014 | Davis Orcutt et al. ..... 530/388.9 |
| 2003/0004405 | A1 | * | 1/2003 | Townsend et al. ............ 600/407 |
| 2003/0118155 | A1 | * | 6/2003 | Ueno et al. .................... 378/177 |
| 2004/0030246 | A1 | * | 2/2004 | Townsend et al. ............ 600/427 |
| 2004/0076262 | A1 | * | 4/2004 | Shao et al. .................... 378/196 |
| 2005/0006586 | A1 | * | 1/2005 | Balan et al. ............. 250/363.02 |
| 2005/0213705 | A1 | * | 9/2005 | Hoffman .......................... 378/63 |
| 2006/0274928 | A1 | * | 12/2006 | Collins et al. ................. 382/132 |
| 2007/0014456 | A1 | * | 1/2007 | Ramamurthy et al. ....... 382/128 |
| 2007/0167749 | A1 | * | 7/2007 | Yarnall et al. ................. 600/431 |
| 2008/0073541 | A1 | * | 3/2008 | Vija et al. ................. 250/363.05 |
| 2008/0081991 | A1 | | 4/2008 | West et al. |
| 2008/0146905 | A1 | * | 6/2008 | Keppel et al. ................. 600/407 |
| 2008/0272304 | A1 | * | 11/2008 | Vija .............................. 250/369 |
| 2009/0123042 | A1 | * | 5/2009 | Gagnon et al. ............... 382/128 |
| 2009/0296998 | A1 | * | 12/2009 | Fox et al. ...................... 382/128 |
| 2010/0046821 | A1 | * | 2/2010 | Manjeshwar et al. ........ 382/131 |
| 2010/0135562 | A1 | * | 6/2010 | Greenberg et al. ........... 382/131 |
| 2010/0303314 | A1 | * | 12/2010 | Chen et al. .................... 382/128 |
| 2010/0308228 | A1 | * | 12/2010 | Vija et al. ................. 250/363.04 |
| 2011/0096970 | A1 | * | 4/2011 | Vija .............................. 382/131 |
| 2011/0110570 | A1 | * | 5/2011 | Bar-Shalev .................. 382/131 |
| 2011/0123083 | A1 | * | 5/2011 | Ojha et al. .................... 382/131 |
| 2012/0170820 | A1 | * | 7/2012 | Declerck et al. ............. 382/128 |
| 2012/0177258 | A1 | * | 7/2012 | Hakl et al. .................... 382/128 |
| 2013/0294570 | A1 | * | 11/2013 | Hansis .............................. 378/4 |

* cited by examiner

*Primary Examiner* — Wenpeng Chen
(74) *Attorney, Agent, or Firm* — The Small Patent Law Group LLC; Dean Small

(57) ABSTRACT

Methods and systems for locating a region of interest in an object are provided. One method includes acquiring planar nuclear medicine (NM) images of a subject from an NM system, wherein the planar NM images include at least one identified region of interest. The method also includes acquiring a three-dimensional (3D) x-ray Computed Tomography (CT) volume image of the subject from an x-ray CT system and locating the region of interest within the 3D CT volume image using the planar NM images.

18 Claims, 7 Drawing Sheets

METHODS AND SYSTEMS FOR LOCATING A REGION OF INTEREST IN AN OBJECT

BACKGROUND OF THE INVENTION

The subject matter disclosed herein relates generally to imaging systems, and more particularly to methods and system for locating regions of interest in objects.

Localizing regions of interest, for example lesions, within medical images of subjects may be performed using image information from multiple imaging modalities. In some systems, image information from a Nuclear Medicine (NM) scan and an x-ray Computed Tomography (CT) scan may be used to locate a lesion within the patient. However, in NM-CT applications, although the CT image acquisition time is relatively short (e.g., 30 seconds to scan a region of interest), the acquisition of NM image information, for example, Single Photon Emission Computed Tomography (SPECT) is significantly longer (e.g., 20-30 minute acquisition time). Accordingly, conventional systems that acquire full SPECT emission data require a longer scan time in order to obtain the SPECT data.

Thus, known systems that use SPECT-CT for localizing regions of interest have long acquisition times, as well as an increased likelihood of motions artifacts in reconstructed images, such as due to patient motion. Additionally, repeated imaging scans also may be required, which increases the amount of injected radiopharmaceutical dose, thereby increasing the amount of radioactive exposure to the patient.

In contrast to SPECT imaging, which requires long acquisition time and yields a three-dimensional (3D) image, planar NM imaging requires much shorter acquisition time, but yields a two-dimensional (2D) image. The 2D images do not include the information on the absolute or exact 3D location of, for example a lesion, within the patient.

Moreover, while 3D anatomic imaging, such as CT or MRI is capable of showing the internal organs of a patient in great details, a radiologist observing such anatomical images, often cannot easily spot lesions such as cancer tumors due to the fact that the image may be rich in structures, and that the tumor may not have significant contrast relative to healthy tissue. In contrast, NM images, both planar and 3D images (known as SPECT) are characterized with high contrast, showing lesions as a location of high concentration of radiolabel pharmaceutical. However, NM images generally do not show the anatomy of the patient.

In order to locate a lesion, and to be able to correlate the location of the lesion relative to the internal anatomy of the patient, known methods use 3D anatomical images registered to 3D NM (SPECT) image. These methods allow overlaying the two types of images (using false colors), or by showing the images side by side, while allowing coordinated navigation within the two images at once. However, 3D NM imaging requires lengthy data acquisition as 3D NM imaging requires obtaining large numbers of NM projections. In contrast, planar NM imaging requires only a short acquisition time, but lacks depth information. Thus, when a radiologist identifies a lesion in a planar NM image, it is not easy for him or her to spot the location of that lesion on the 3D anatomical image.

BRIEF DESCRIPTION OF THE INVENTION

In one embodiment, a method for locating a region of interest within a subject is provided. The method includes acquiring planar nuclear medicine (NM) images of a subject from an NM system, wherein the planar NM images include at least one identified region of interest. The method also includes acquiring a three-dimensional (3D) x-ray Computed Tomography (CT) volume image of the subject from an x-ray CT system and locating the region of interest within the 3D CT volume image using the planar NM images.

In another embodiment, a method for identifying a region of interest within a subject is provided. The method includes acquiring x-ray Computed Tomography (CT) data, acquiring Nuclear Medicine (NM) data, and determining a ratio value of radioactivity at a region of interest using a pair of NM planar images generated from the NM data. The method also includes creating a three-dimensional (3D) CT attenuation ratio map using the x-ray CT data and the NM data and deriving from the 3D CT attenuation ratio map a depth profile for a determined location of the region of interest from the NM planar images. The method further includes identifying a distance ratio within the depth profile using the ratio value and determining a depth of the region interest using the distance ratio. In yet another embodiment, an imaging system is provided that includes a Nuclear Medicine (NM) imaging modality unit configured to acquire planar NM images of a subject and an x-ray Computed Tomography (CT) imaging modality unit configured to acquire a three-dimensional (3D) x-ray Computed Tomography (CT) volume image of the subject. The imaging system also includes a processor including a region of interest localizing module configured to locate a region of interest within the 3D CT volume image using the planar NM images.

DETAILED DESCRIPTION OF THE INVENTION

Figure 1:
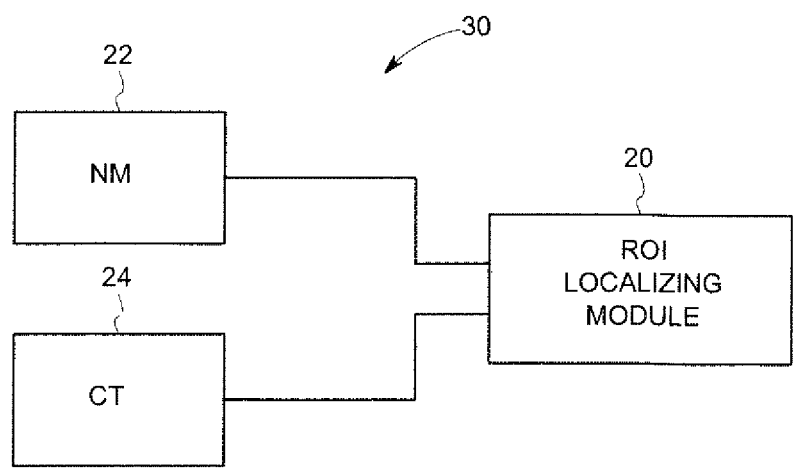
FIG. 1 is a simplified block diagram of an imaging system formed in accordance with various embodiments.

The foregoing summary, as well as the following detailed description of various embodiments, will be better understood when read in conjunction with the appended drawings. To the extent that the figures illustrate diagrams of the functional blocks of the various embodiments, the functional blocks are not necessarily indicative of the division between hardware circuitry. Thus, for example, one or more of the functional blocks (e.g., processors or memories) may be implemented in a single piece of hardware (e.g., a general purpose signal processor or a block of random access memory, hard disk, or the like) or multiple pieces of hardware. Similarly, the programs may be stand alone programs, may be incorporated as subroutines in an operating system, may be functions in an installed software package, and the like. It should be understood that the various embodiments are not limited to the arrangements and instrumentality shown in the drawings.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising" or "having" an element or a plurality of elements having a particular property may include additional elements not having that property.

Also as used herein, the phrase "reconstructing an image" is not intended to exclude embodiments in which data representing an image is generated, but a viewable image is not. Therefore, as used herein the term "image" broadly refers to both viewable images and data representing a viewable image. However, many embodiments generate, or are configured to generate, at least one viewable image.

Various embodiments provide systems and methods for locating one or more regions of interest (ROIs) in a three-dimensional (3D) volume using two-dimensional (2D) images. For example, a lesion may be identified and located using the information from the same attenuation paths along which Nuclear Medicine (NM) emissions and x-ray Computed Tomography (CT) transmissions travel. At least one technical effect of various embodiments is a shorter acquisition time and/or lower injected dose of a radiopharmaceutical in a subject, such as a patient.

By practicing at least some embodiments, automatic correlation of the location of a lesion that was identified in a planar NM image with a location on a 3D anatomical image may be provided. It should be noted that accuracy of the correlation may be reduced in the depth axis and yet benefit the radiologist. Identification of the lesion in the 2D NM image may be automatic, based on concentration of counts in a lesion being above a defined threshold (e.g., an absolute preset threshold level) or above a threshold determined by the average count density in the image (such as twice or other factor higher count density in the lesion compared to the average count density). Alternatively, identification of the lesion in the 2D NM image may be performed manually by the user identifying (e.g., pointing with a mouse) to an X,Z location on the 2D NM image as described in more detail herein. In response, various embodiments may create a 3D mark on the estimated location that is correlated with the lesion on the 3D anatomical image, and display at least one, and optionally a plurality of planes (e.g., coronal, sagittal and transverse planes, or oblique plans) that intersects with the created mark. Optionally, the created mark may be shaped (at least in the X and Z dimensions), such as in the shape of the identified lesion. Alternatively, the created mark indicates the center of the identified lesion.

In various embodiments, as shown in FIG. 1, an ROI localizing module 20 uses information from an NM system 22 (e.g., a Single Photon Emission system) and an x-ray CT system 24 to localize and locate a region of interest (ROI), for example, a lesion within a patient, such as an NM lesion. It should be noted that the NM system 22 and the CT system 24 are combined in a multi-modality imaging system, such as to form an imaging system 30. However, in other embodiments, the NM system 22 and the CT system 24 may be separate scanners. The various embodiments use planar images from the NM system 22, such as from a dual head gamma camera arrangement, in combination with 3D volume information from the x-ray CT system 24 to locate an ROI, such as a lesion. The planar images and the 3D volume information may be registered such that the data from each system 22 and 24 is aligned.

Figure 2:
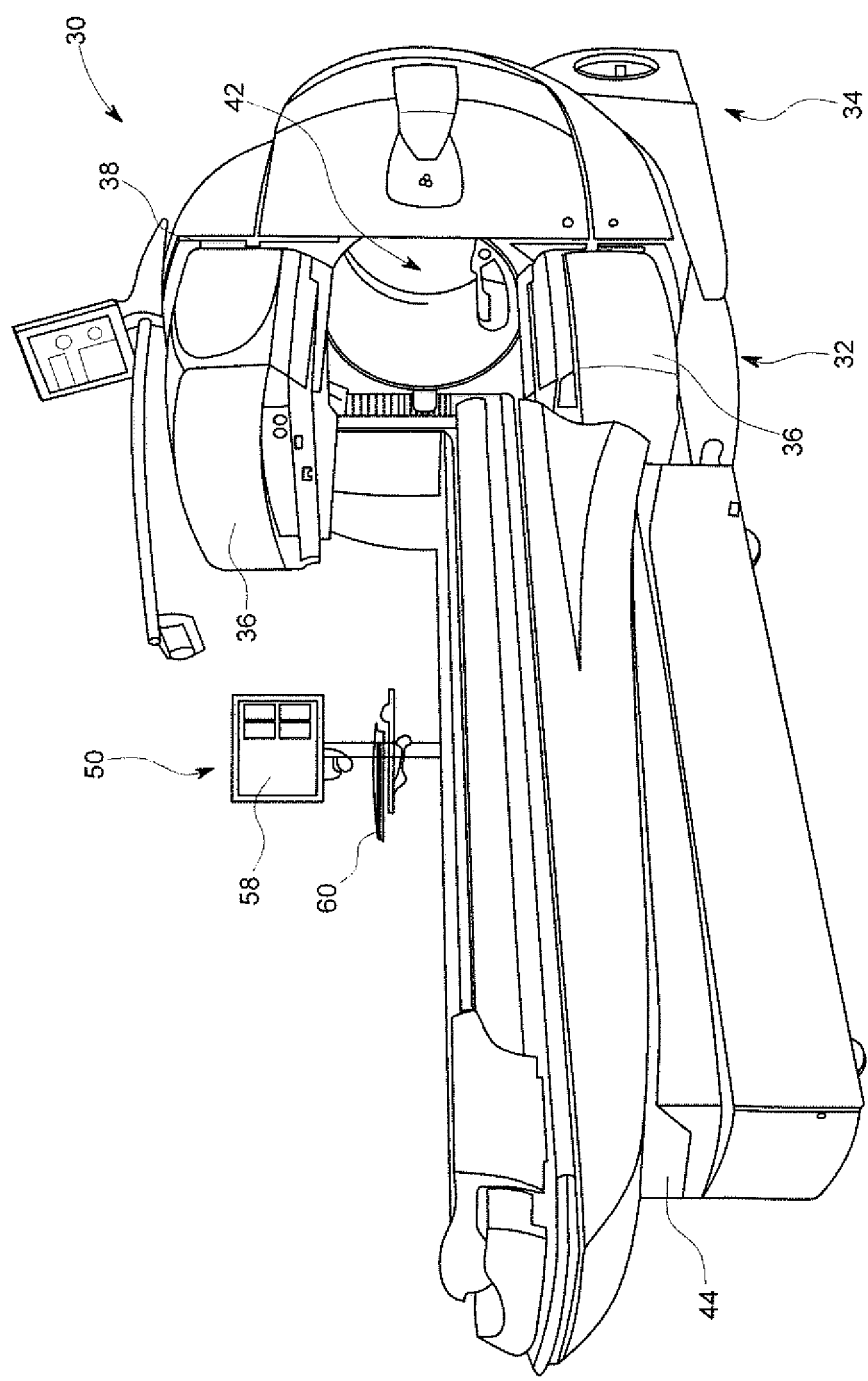
FIG. 2 is a pictorial view of an exemplary imaging system formed in accordance with various embodiments.

The ROI localizing module 20 may be utilized with an imaging system such as the imaging system 30 as shown in FIG. 2. In various embodiments, the imaging system 30 is a multi-modality imaging system that includes different types of imaging modalities, illustrated as SPECT and CT. However, the various embodiments may be used in combination with other modalities, such as Magnetic Resonance Imaging (MRI) or another system capable of generating diagnostic images. Although the imaging system 30 is a SPECT-CT system, it should be realized that the various embodiments are not limited to multi-modality medical imaging systems, but may be used on a single modality medical imaging system such as a stand-alone SPECT imaging system or a stand-alone CT system, for example. Moreover, the various embodiments are not limited to medical imaging systems for imaging human subjects, but may include veterinary or non-medical systems for imaging non-human objects, etc.

Referring to FIG. 2, the multi-modality imaging system 30 includes a first modality unit 32 and a second modality unit 34. In the illustrated embodiment, the first modality unit 32 is the NM system 22 (shown in FIG. 1) and the second modality unit 34 is the CT system 22 (shown in FIG. 1). However, the locations and positions of the modality units 32 and 34 may be modified (e.g., the second modality unit 34 positioned before the first modality unit 32). The two modality units enable the multi-modality imaging system 30 to scan an object or subject in a first modality using the first modality unit 32 and to scan the subject in a second modality using the second modality unit 34. The multi-modality imaging system 30 allows for multiple scans in different modalities to facilitate an increased diagnostic capability over single modality systems.

The imaging system 30 is shown as including a gantry 38 for supporting the imaging components of the first and second modality units 32 and 34. It should be noted that in some embodiments a separate gantry may be provided for each of the first and second modality units 32 and 34 (and that the gantries some embodiments are spaced apart and/or are oriented along different axes). During operation, the subject is positioned within a central opening 42, defined through the imaging system 30, using, for example, a motorized table 44. The first modality unit 32 includes gamma cameras 36 in one embodiment to detect gamma emissions from the subject. The gamma cameras 36 are illustrated in an H-mode of operation to acquire planar NM images as described in more detail herein. The second modality unit 34 includes an x-ray source (e.g., the x-ray tube 209 shown in FIG. 10) that projects a beam of x-rays through the subject 206 (shown in FIG. 11). After being attenuated by the subject 206, the x-rays impinge on a detector (e.g., the x-ray detector 211 shown in FIG. 11) located on the opposite side of the gantry 38.

The imaging system 30 also includes an operator workstation 50. During operation, the motorized table 44 moves the subject into the central opening 42 of the gantry 38 in response to one or more commands received from the operator workstation 50. The workstation 50 then operates the first and/or second modality units 32 and 34 to both scan the subject to acquire an attenuation projection data set and/or an emission projection dataset. In one embodiment, the attenuation data set is of a 3D volume of the subject, such as an ROI, and the emission projection dataset includes planar NM images.

The workstation 50 may be embodied as a personal computer (PC) that is positioned near the imaging system 30 and hard-wired to the imaging system 30 via a communication link. The workstation 50 may also be embodied as a portable computer such as a laptop computer or a hand-held computer that transmits information to, and receives information from the imaging system 30. Optionally, the communication link may be a wireless communication link that enables information to be transmitted to and/or from the workstation 50 to the imaging system 30 wirelessly. In operation, the workstation 50 is configured to control the operation of the imaging system 30, such as in real-time. The workstation 50 is also programmed to perform medical image diagnostic acquisition and reconstruction processes described herein, including localizing objects with ROIs of the subject, such as lesions within the subject.

The operator workstation 50 includes central processing unit (CPU) or computer, a display 58, and an input device 60 (e.g., a keyboard or mouse). As used herein, the term "computer" may include any processor-based or microprocessor-based system including systems using microcontrollers, reduced instruction set computers (RISC), application specific integrated circuits (ASICs), field programmable gate array (FPGAs), logic circuits, and any other circuit or processor capable of executing the functions described herein. The above examples are exemplary only, and are thus not intended to limit in any way the definition and/or meaning of the term "computer". In the exemplary embodiment, the computer executes a set of instructions that are stored in one or more storage elements or memories, in order to process information received from the first and second modality units 32 and 34. The storage elements may also store data or other information as desired or needed. The storage element may be in the form of an information source or a physical memory element located within the computer.

The imaging system 30 also includes the ROI localizing module 20 (shown in FIG. 1) that uses the attenuation projection data set and the emission projection dataset to localize a lesion within the subject, such as to locate an NM lesion imaged within the subject. The ROI localizing module 20 is configured to implement various methods described herein. The ROI localizing module 20 may be implemented as a piece of hardware that is installed in the computer. Optionally, the ROI localizing module 20 may be implemented as a set of instructions that are installed on the computer. The set of instructions may be stand alone programs, may be incorporated as subroutines in an operating system installed on the computer, may be functions in an installed software package on the computer, and the like. It should be understood that the various embodiments are not limited to the arrangements and instrumentality shown in the drawings.

Figure 3:
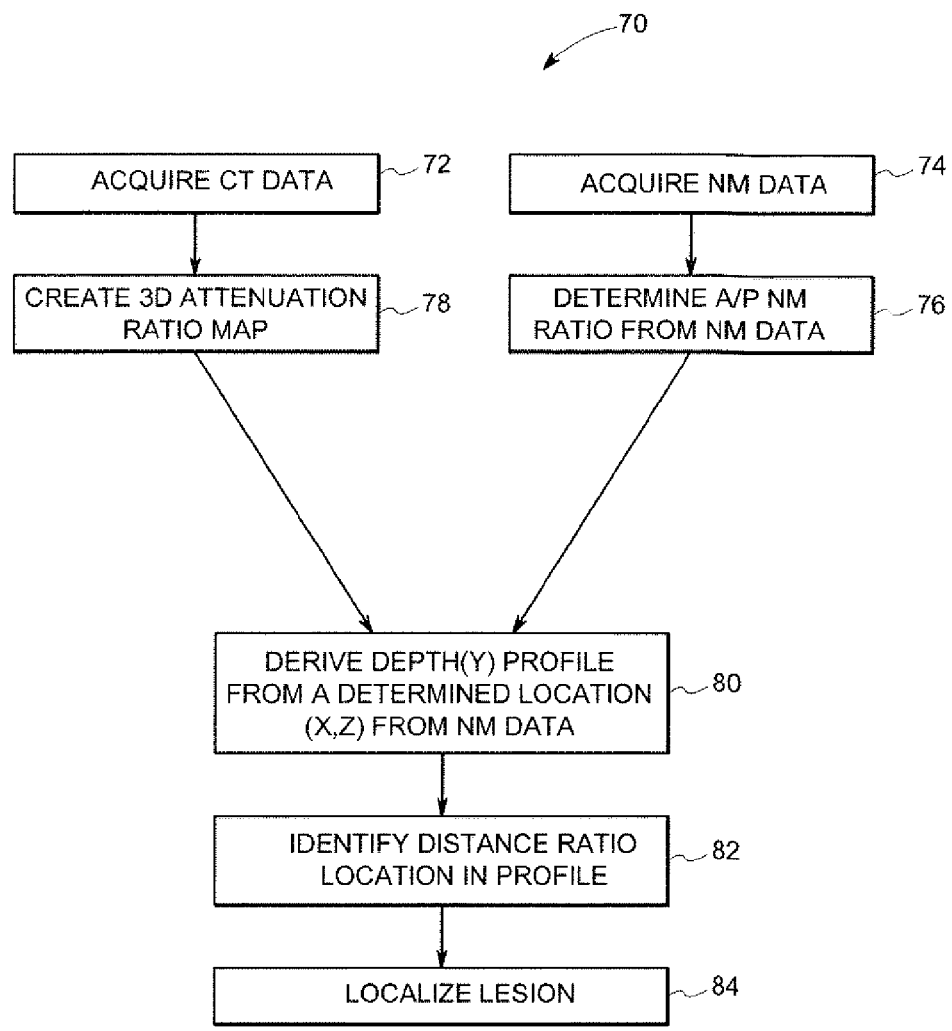
FIG. 3 is a flowchart of a method for locating a region of interest in an object in accordance with various embodiments.

FIG. 3 is a flowchart of a method 70 for locating an object or ROI within a volume, such as a lesion or other ROI within a patient. It should be noted that although the method 70 is described in connection with localizing and locating a lesion within a patient, in particular an NM lesion (e.g., lesion NM hot spot), the various embodiments may be used to locate different objects within the patient. In general, the method 70 uses information regarding the difference in attenuation for NM data received at each of a pair of NM detectors in combination with a registered 3D volume of the ROI to determine a location of the lesion, including a planar location (X,Z) and a depth location (Y) for the lesion.

The method 70 includes acquiring a 3D image of the ROI of a subject, for example CT data at 72. Alternatively, another 3D image of the object is acquired such as MRI image. The ROI may be a portion of the subject or may include a whole body scan. The CT data corresponds to a 3D volume that includes, for example, the ROI, such as an organ having an uptake of a radiopharmaceutical. The CT data 72 may be from a current CT scan or a previous CT scan. The CT scan may be performed using any type of CT imaging technique.

The method also includes acquiring NM data at 74, which in one embodiment is acquired after acquiring CT data. However, the NM data may be acquired prior to or concurrently with the acquisition of the CT data. In some embodiments, the CT data is acquired in an interleaved manner with the CT data. In various embodiments, NM emission data is acquired by a pair of parallel gamma cameras that each acquires planar NM images of the distribution of the radiopharmaceutical in the organ of interest. For example, in one embodiment, NM foci lesions (e.g., small tumors or a sentinel node) are acquired using dual gamma camera heads in opposite views (e.g., 180 degrees apart, such as above and below or on each side of the subject), which may be referred to as planar NM imaging. In one embodiment, the planar images are formed from NM data acquired over a shorter period of time, for example, 25-30 seconds instead of 10 or more minutes for forming a 3D SPECT image. Thus, in various embodiments, emission photon counts are acquired for about 30 seconds and use to generate two planar NM images corresponding to the counts acquired by the two gamma cameras.

The lesion is then identified on the 2D NM image. Identification of the lesion in the 2D NM image may be automatic, based on concentration of counts in a lesion being above, for example, an absolute preset threshold level, or above a threshold determined by the average count density in the image (such as twice or other factor higher count density in the lesion compare to the average count density). Alternatively, identification of the lesion in the 2D NM image may be performed manually by the user pointing to an X,Z location on the 2D NM image. Optionally, a plurality of such lesions is identified (automatically or manually). The lesion is defined for example as a circle having a predefined, or user defined radius around the manually identified lesion. Alternatively, the lesion's perimeter is marked by the user with a pointing device such as a mouse. Alternatively, the center of the lesion is identified by searching for a maximum count density in the vicinity of a location pointed by the user. Alternatively, the lesion shape and size is automatically determined by searching for a maximum count density and marking as a lesion zone all the pixels contiguous with the location of the maximum that have a value above a preset percentage (for example 30% or 75%) of the maximum. Methods known in the art also may be used to identify and optionally delimitate the lesion or lesions on the 2D NM image.

Thereafter, an emission ratio of a detected lesion is determined from the NM data at 76. In various embodiments, identification of the lesion is performed using a single planar image derived from data acquired by both of the gamma cameras, which may be referred to as anterior (A) and posterior (P) gamma cameras (above and below the subject, respectively). For example a sum or average of the counts in the images may be displayed. Alternatively, the two images may be shown side by side, and manual identification may be performed on one or both of the images. It should be noted that the two 2D NM images are spatially correlated as the positions of the two detectors relative to each other is known.

The location of the imaged lesion may be determined in the plane of each of the gamma cameras. Thus, the X (transverse to the subject) and Z (head to toe along the subject) distance, which defines the planar coordinate of the lesion may be determined. A difference in the determined uptake (e.g., measured photon counts) by each of the gamma cameras results from a difference in the attenuation for the NM emission photon. Thus, if the lesion is off center between the two gamma cameras, the attenuation to the closer camera (closer to the lesion) is less than the attenuation to the further camera as the emission travels through more of the body of the subject. For example, a lesion will appear brighter in an image acquired by a gamma camera closer to the lesion. When the lesion is at or near the center of the body, or when the attenuation is small, an image combining data from both detectors is generally less noisy, and the lesion more easily found on the combined image. However when the lesion is substantially closer to one detector, the image of the closer detector may be of higher lesion/background contrast and the lesion more easily found on that image. Thus, optionally, any or both individual images and combined image may be used by the user or by the automatic lesion-finding algorithm.

Figure 4:
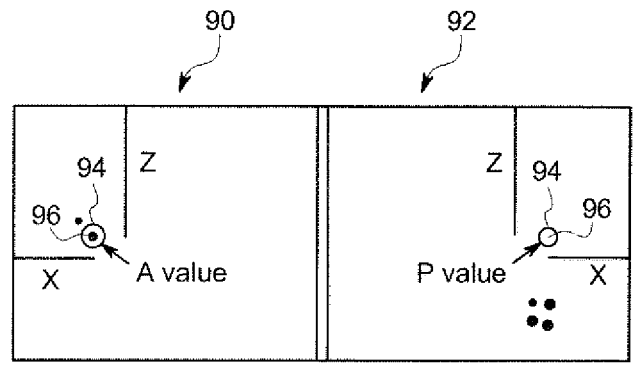
FIG. 4 is a simplified diagram of Nuclear Medicine (NM) images used in accordance with various embodiments.

FIG. 4 illustrates an anterior NM image 90 and a posterior NM image 92 that may be acquired at 74. Each of the NM images 90 and 92 are planar images, which are generated over a shorter time period than a full 3D NM image. An ROI, for example a hot spot 96 within each of the images, is then identified. In FIG. 4, the ROI is illustrated within the circles 94, which may be identified manually by a user or automatically, which then may be confirmed or modified (e.g., moving the circle 94) by the user. For example, a lesion may be manually identified (e.g., by a user clicking on the hot spot 96 within the images 90 and 92) or automatically identified (e.g., by identifying brighter pixels within the images 90 and 92 compared to the background). It should be noted that the ROI may be identified by different means, such as, clicking on the hot spot 96 or drawing a bounding box around the hot spot. As can be seen, the hot spot 96 in the anterior NM image 90 is more visible than in the posterior NM image 92 resulting from greater attenuation in NM emission counts in the posterior NM image 92.

With the hot spot 96 identified, a location of the hot spot 96 within the images may be determined. For example, the pixel location of the hot spot 96 may be determined in the X and Z directions as illustrated in FIG. 4, such as using a pixel counting technique or other suitable method. Additionally, the brightness value, for example, based on the number of detected emission counts at the hot spots 96 in each of the image 90 and 92 is calculated. Thus, using the planar images 90 and 92, brightness values, referred to as an anterior (A) value and a posterior (P) value are determined in addition to the location of the ROI in the X and Z directions. Accordingly, using the NM data, the approximate X,Z location (the location along the camera face) of the lesion, as well as a ratio of the brightness of the lesion based on the number of counts (and attenuation) at that location may be determined. For example, the X, Z coordinates of a lesion may be assigned as the center of gravity of the count density of the spot.

Referring again to FIG. 3, using the A and P values determined from the planar images 90 and 92 at the location of the ROI, namely the hot spot 96, an A/P NM ratio may be determined at 76, which is the ratio of the brightness of the lesion (represented by the hot spot 96) in the A image 90 to the brightness of the lesion in the P image 92. Accordingly, A/P ratio=A value/P value. The A and P values may be taken as the sum, or average of the values of pixels within the hot spot 96. It should be noted that in some embodiments an average background radiation may be subtracted from the measured A and P values before calculating the A/P ratio. For example, the average background radiation may be estimated by defining a background zone close, around, and/or outside the lesion, with an area comparable or larger than the area of the lesion, and calculating the average background count density per pixel in the background zone. The average background count density per pixel is then subtracted from each pixel in the lesion area.

A 3D CT attenuation map is also created, which is used to create 3D A/P CT attenuation ratio map at 78. For example, using the CT volume data, such as a 3D CT image that is a 3D volume 100 formed form a number of CT image slices 102, and the attenuation data from the planar NM images, an A/P CT attenuation map 104 may be created. In various embodiments, from the CT data acquired at 72, such as a CT volume of the subject or an area that includes the ROI (which is registered CT data in various embodiments), a 3D attenuation map is derived as the A/P CT attenuation map 104. For example, the CT image slices 102 may be translated into a corresponding gamma attenuation map such as by converting x-ray energy into gamma energy for a particular isotope (e.g., radioisotope (such as I 131) causing the emissions that form the hot spot 96), which may be performed using known energy conversion values.

Figure 5:
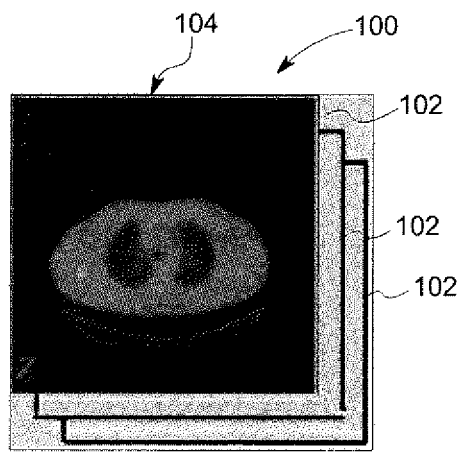
FIG. 5 is a diagram of a three-dimensional (3D) attenuation map formed in accordance with various embodiments.
Figure 6:
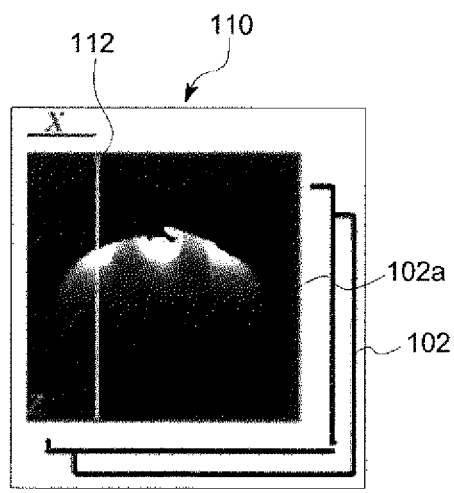
FIG. 6 is a diagram of a 3D attenuation ratio map formed in accordance with various embodiments.

With the x-ray energy values translated or converted to gamma energy values to generate the A/P CT attenuation map 104, a 3D A/P CT attenuation ratio map 110 as shown in FIG. 6 is generated, wherein each point in the image represents the ratio of attenuation from top of the slice (front of the patient) and the attenuation from the bottom of the slice (back of the patient). The 3D A/P CT attenuation ratio map 110 is generated slice by slice by calculating an A/P CT ratio for the pixels in each of the image slices 102 and based on the gamma energy values from the A/P CT attenuation map 104 (shown in FIG. 5). For example, in one embodiment, the A/P CT ratio is determined as the ratio of (i) the integral of the value from a point within the A/P CT attenuation map 104 to the top of the image slice (anterior side) to (ii) the integral of the value from the point within the A/P CT attenuation map 104 to the bottom of the image slice (anterior side). Thus, the A/P CT ratio is the integral of the attenuation along the Y axis (depth axis). Thus, in one embodiment, the A/P CT ratio is defined as:

$$APRatio = \frac{\int_y^0 AttMap(Z, y, X)}{\int_y^{FrameSizeY} AttMap(Z, y, X)}$$

Figure 7:
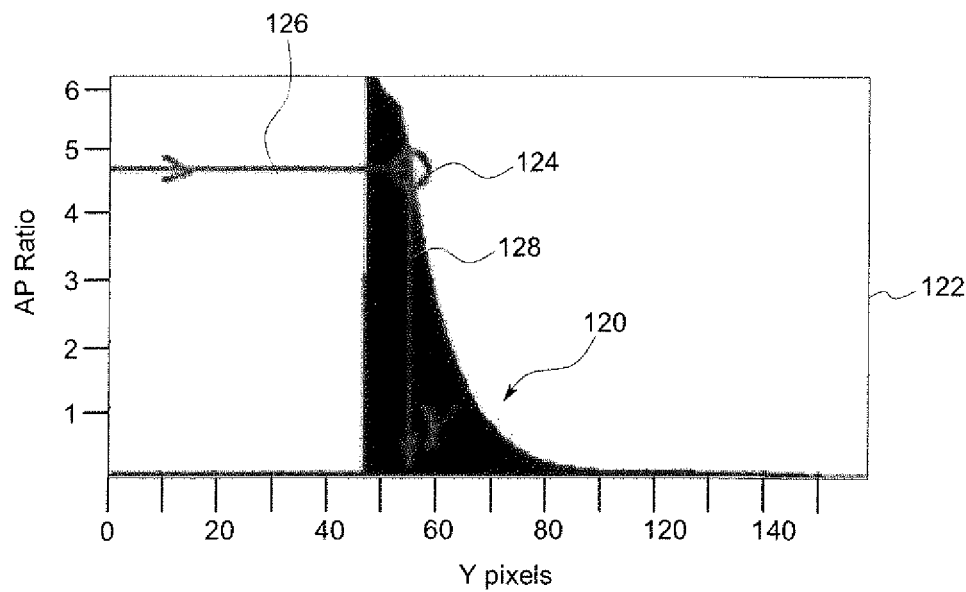
FIG. 7 is a graph of a depth profile along the front to back at the displacement X, as depicted in FIG. 6, formed in accordance with an embodiment.

From the 3D A/P CT attenuation ratio map 110 a depth (Y) profile 120 may be derived as illustrated in the graph 122 shown in FIG. 7. In particular, using the NM images 90 and 92 shown in FIG. 4, the X and Z locations of the ROI are known. Also, as shown in FIG. 6, the image slice corresponding to the ROI is known from the Z value in the NM image 90 and 92. Thus, in the illustrated embodiment, the single slice 102a in the 3D A/P CT attenuation ratio map 110 is used to derive the depth profile 120. Additionally, from the NM images 90 and 92, the X location of the ROI is also known. Thus, the depth profile 120 in various embodiments is generated along a line 112 (shown in FIG. 6) which corresponds to the A/P CT ratio values along the depth axis (Y axis) at the determined distance X in the image slice 102a (at the determined distance Z). Thus, from the NM data, in particular the NM images 90 and 92, the planar X and Z locations are known, such that the depth profile 120 is derived along the single line 112.

In the graph 122, the X-axis corresponds to the Y depth (e.g., Y pixels from the top to bottom of the image slice 102a in FIG. 6) and the Y-axis corresponds to the A/P CT ratio values from the 3D A/P CT attenuation ratio map 110 (shown in FIG. 6), along the line 112. Thus, the depth profile 120 corresponds to a projection of the profile of the A/P NM ratio values along the line 112. As can be seen, for the dark regions in the 3D A/P CT attenuation ratio map 110, the A/P CT ratio value is zero and then increases in the brighter regions of the 3D A/P CT attenuation ratio map 110. In the graph 122, the X-axis from left to right corresponds to the line 122 from the top to bottom of the image slice 102a as viewed in FIG. 6. It should be noted that the values in the graph 122 are normalized to the NM data. Also, it should be noted that in various embodiments the A/P CT ratio values are not evaluated across the entire volume, but only for the known X and Z. Additionally, in various embodiments, the A/P CT ratio are determined only for Y values within the volume or subject, such as between a minimum Y value and a maximum Y value corresponding to the edges of the body of the subject. For example, the value may be determined only along Y within a portion of the subject 36, such as the limbs of the subject 36.

Returning to FIG. 3, at 82 the distance ratio location 124 (as shown in FIG. 7) is determined from the depth profile 120. The A/P NM ratio determined at 76 from the planar images 90 and 92 is the located along the Y-axis, which in the illustrated embodiment is at 4.5. A point along a horizontal line 126 from this Y-axis location is then determined in the depth profile 120 as the distance ratio location 124. As can be seen, this location is the point in the graph 122 that has a non-zero value along the line 126 that is the furthest point from the Y-axis, namely having the highest X-axis value within the depth profile 120 along the line 124. At this point, which is the distance ratio location 124, the corresponding depth is determined along the X-axis, represented by the vertical line 128. In the illustrated embodiment, this value corresponds to a depth of about 56 pixels.

Figure 8:
FIG. 8 is a Computed Tomography (CT) image showing a region of interest identified in accordance with various embodiments.

Accordingly, the location of the ROI, such as the hot spot 96 shown in the NM images 90 and 92 (shown in FIG. 4) can now be located within a CT image 130 as shown in FIG. 8. In particular, the X and Z location of the ROI is known from the NM images 90 and 92 and the Y location of the ROI is known from the depth profile 120. As shown in FIG. 8, the CT image slice 134 (corresponding to the Z location) from the CT data acquired at 72 is used with the ROI 132 (corresponding to the hot spot 96) identified (e.g., with a marker, such as a circle) at the determined X and Y location within the image slice 134 within the Z plane. It should be noted that the distance values, such as the number of pixels corresponding to the determined distance in the CT may be determined in some embodiments by adjusting the NM image distance value, such as using an appropriate scaling factor. In the illustrated embodiment, the ROI 132 corresponding to the hot spot 96 may represent a lymphoma region within the bone imaged in the CT image 134.

For example, in one embodiment, the following steps are performed:
(1) Steps related to the NM camera:
  (A) Acquiring NM data (two images: head 1 and head 2);
  (B) Finding the lesion (on at least one of the images, or on a combined image);
  (C) Defining the zone of the lesion (on each image); and
  (D) From (1) B-C: calculate {X,Z} and A/P for the lesion.
(2) Steps related to the anatomical camera (CT, but optionally MRI):
  (It should be noted these steps may be performed before/during/after (1), such as in a multimodality NM-CT camera)
  (A) Acquiring data; and
  (B) Reconstructing a 3D anatomical image.
(3) Steps related to the anatomical image and the NM lesion:
  (A) Registration of the 3D anatomical image with 2D NM image.

In a multimodality camera, where the two modalities are acquiring data from the patient at the same modality—the registration is provided by the gantry and bed coordinates. If the images are acquired during different imaging sessions, image registration is performed. For example, body boundaries may be used to perform the 3D-2D registration.

(B) Transforming the anatomical image to equivalent NM attenuation.

It should be noted that this step may be performed for the entire anatomical image, regardless of the location of the lesion, or once the {X,Z} coordinates are determined, this transformation is performed only to values along the line {X(of lesion), y(all values within the body), Z(of lesion)} for CT. It also should be noted that there is a simple transformation function from "CT numbers" to NM attenuation values. The function depends on the (known) X-Ray spectrum and the (known) isotope photon energy (or if multiple energies—for each energy peak). It further should be noted that the process may be refined by "segmenting" the CT image to "organ types" (at least "air" and "tissue"; but "air", "lungs", soft tissue" and "bone" may be used for better accuracy . . . ). The attenuation coefficient(s) of each "organ type" is known at the NM energy(s)

With respect to MRI (and any other 3D imaging modality), because there is no direct relation from MRI image to NM attenuation, the process uses "segmenting" the MRI image to "organ types" (at least "air" and "tissue"; but "air", "lungs", soft tissue" and "bone" may be used for better accuracy . . . ). The attenuation coefficient(s) of each "organ type" is known at the NM energy(s). Optionally, the "NM attenuation image" may be displayed from (3)(B)1 (shown in FIG. 5), but is optional. Additionally, the "NM attenuation image" may be displayed as a 3D image (or a plurality of slices), or only the slice that intersects the lesion, or a graph along the "y" line along at coordinates X,Z (or not at all).

(4) Calculating the depth of the lesion (from the attenuation map and the A/P ratio):

It should be noted that the following applies when the lesion is larger than the resolution of the collimator used for the NM images or the "lesion zone" used for averaging A and P are larger than the resolution of the collimator used for the NM images. In various embodiments, at least one of the above is assumed.

(A) Attenuation:
The decline in radiation may be defined as:

$$dR/dy = -R*a(y)$$

where R is the flux of gamma photons (parallel beam)
a(y) is the total (absorption+scattering) coefficient at coordinate y (at the gamma energy).
For a homogeneous substance (a(y)=a, a constant), the following results:

$$R(y) = R(0)*Exp[-a*y]$$

If a(y) is not constant, then:

$$R(y) = R(0)*Exp[-INTEGRAL\{a(y')*dy', y'=0 \text{ to } y\}]$$

Now, assuming that there is a source, at depth "y" that generates upwards going flux R, and same downward going flux R, and assuming that "y" along the line along the {X,Z} line starts at y=0 and end at y=y(max), then:

R1 (equal to "A" as used herein) is given by:
R1=R*Exp[-INTEGRAL{a(y')*dy', y'=0 to y}] (where "0" is the bottom of the line, and y is the depth of the lesion), and
R2 (equal to "P" as used herein) is given by:
R1=R*Exp[-INTEGRAL{a(y')*dy', y'=y to y(max)}] (where "0" is the bottom of the line, and y is the depth of the lesion)
The A/P ratio is given by:

$$A/P=R1/R2=(R*Exp[-INTEGRAL\{a(y')*dy', y'=0 \text{ to } y\}])/R*Exp[-INTEGRAL\{a(y')*dy', y'=y \text{ to } y(max)\}]$$

R cancels out, and taking a Ln of the equation results in:

$$Ln(A/P)=-INTEGRAL\{a(y')*dy', y'=y \text{ to } y(max)\}+INTEGRAL\{a(y')*dy', y'=0 \text{ to } y\}$$

Now, with the total attenuation along the line given by:

$$a(total)=INTEGRAL\{a(y')*dy', y'=0 \text{ to } y(max)\},$$
$Ln(A/P)$ is rewritten as:

$$Ln(A/P)=a(total)-2*INTEGRAL\{a(y')*dy', y'=y \text{ to } y(max)\}$$

In the pixilated 3D image, integration is replaced by summation of the attenuation coefficient assigned to the image voxel (normalized to the voxel's size)

(B) Estimation of the depth "y" of the lesion:
The function Ln(A/P) may be plotted from the above, and the "y" value determined where Ln(A/P) is equal to the logarithm of the experimentally determined A/P ratio.

Figure 9:
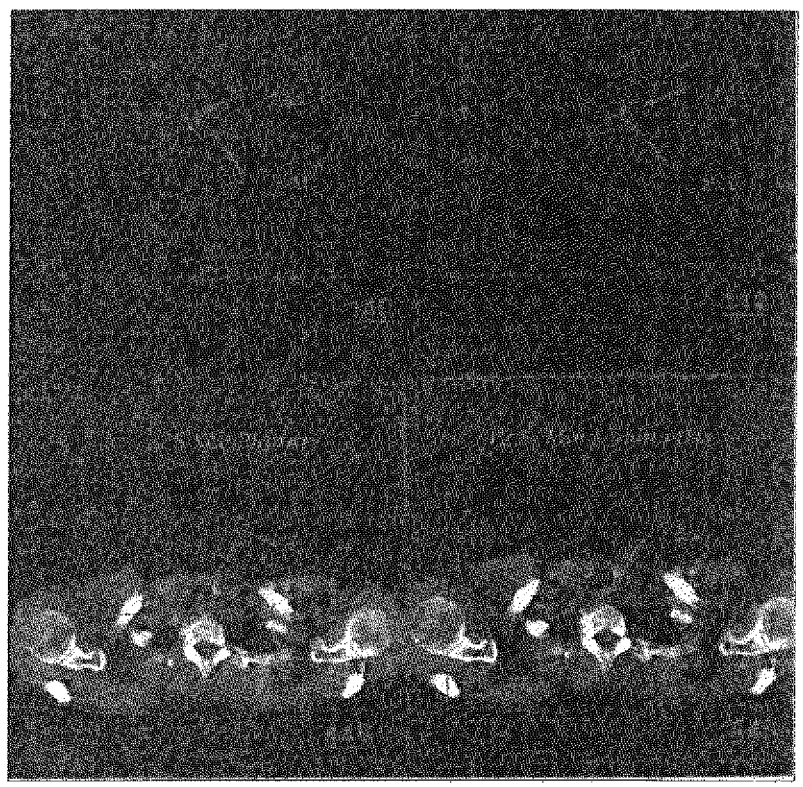
FIG. 9 are images illustrating a region of interest identified in accordance with various embodiments and a region of interest identified using three-dimensional NM image data.

(5) Presenting the estimated location of the lesion on the anatomical map:
A lesion (e.g., a sphere with a preset radius) centered at the coordinates {X,y,Z} in the anatomical map is marked. It should be noted that a standard 3D navigational tool may be applied to show and rotate slices intersecting the point {X,y,Z} and view the marker as shown in FIG. 9.

Thus, various embodiments determine the location of an ROI, for example, a lesion within a subject (e.g., imaging hot spots or other foci image), using NM planar images along with a CT volume. For example, as shown in FIG. 9, the NM images 140 and 142 correspond to NM emission data from a 25 planar acquisition and one slice of a 3D SPECT image, reconstructed from data acquired in a 12.5 minute volume acquisition, respectively.

It should be noted that the image 140 is a planar, 2D image formed by summing the counts from both NM detectors. The coordinates X and Z are marked on the image 140. The image 146 is a sagittal slice at the depth "y" of the 3D image formed by (the longer) SPECT acquisition of the same patient. The coordinates X and Z are marked on the image 146.

The lesion 144 can be seen as "hot spots" 990 and 992 in each of the images 140 and 142 respectively. The images 146 and 148 are the same transverse slice in the 3D CT image at the plane "Z" where the lesion 144 is located, each having the location of the lesion 144 identified thereon by red marker 996 and 998, respectively. The coordinates X and Y are marked on thereon.

The red marker 996 illustrated as the circle 996 in image 146 is the marker placed according to various embodiments at the location {X, y} where the depth "y" was estimated according to various embodiments. The image 146 has the lesion 144 identified by the marker 998, which was placed by copying the boundaries of the hot spot 992 from the 3D image 142 to the 3D image 148 (thus, the marker 998 is not necessarily circular).

In the various embodiments, the hot spot 144 is located using a planar NM image acquisition of less than about 30 seconds instead of over 10 minutes. The similarity of the location of the markers 996 and 998 should be noted, indicative of the accuracy of various embodiments.

It also should be noted that in order to locate the lesion 144 according to an exemplary embodiment, the user only needs to point at the hot spot 990 on a single 2D image 140 instead of viewing all the slices in the 3D SPECT image, and locating the hot spot 992 in the correct slice 142.

Figure 10:
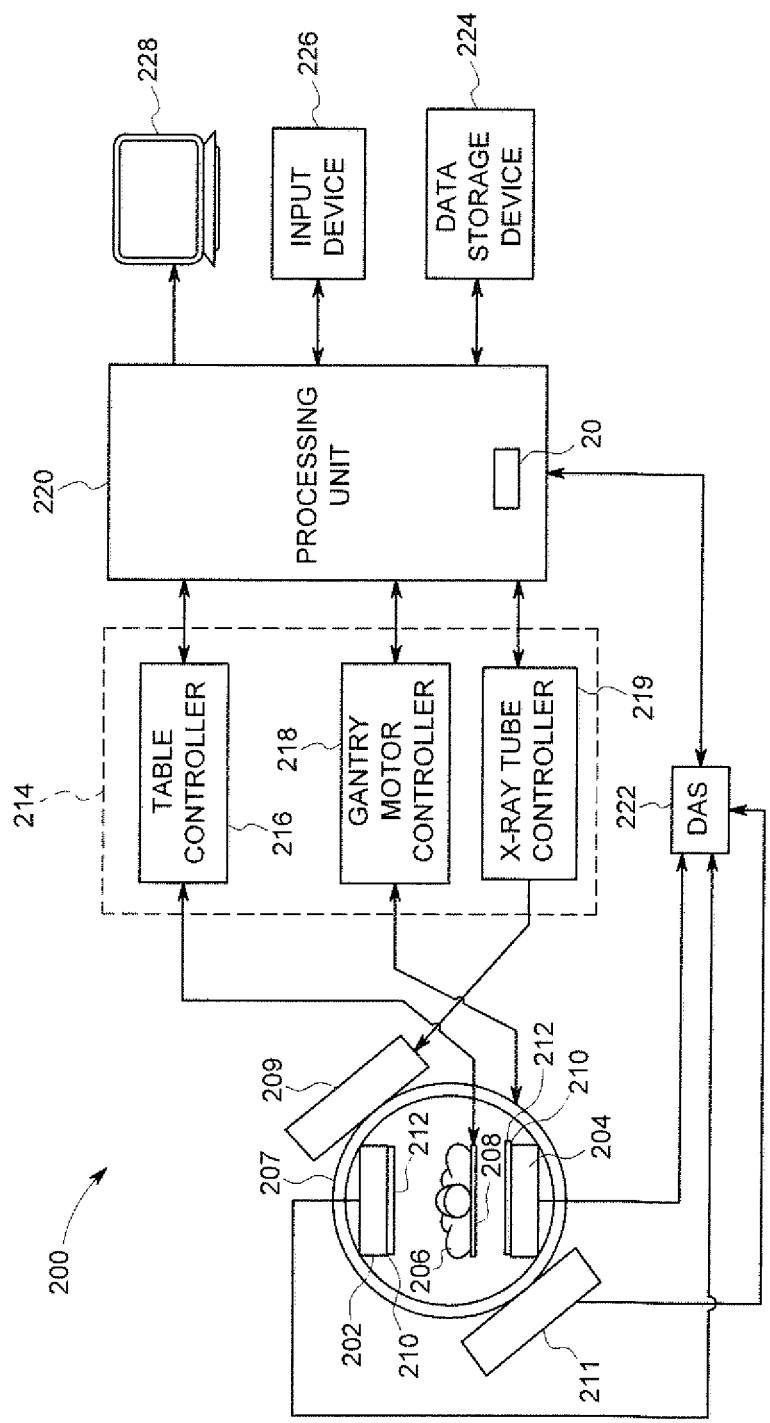
FIG. 10 is a schematic illustration of an NM imaging system in accordance with an embodiment.

Various embodiments of the methods and ROI localizing module 20 described herein may be provided as part of, or used with, a medical imaging system, such as the dual-modality imaging system 30 as shown in FIG. 1. FIG. 10 is a block schematic diagram of an NM imaging system 200 that be embodied, for example, as the NM system 22 (shown in FIG. 1).

The NM imaging system 200 includes two gamma cameras 202 and 204 (illustrated in an H-mode of operation, but may be operated in different modes) mounted to a gantry 207. The gamma cameras 202 and 204 are each sized to enable the system 200 to image a portion or all of a width of a patient 206 supported on a patient table 208. Each of the gamma cameras 202 and 204 in one embodiment is stationary, with each viewing the patient 206 from one particular direction. However, the gamma cameras 202 and 204 may also rotate about the gantry 207. The gamma cameras 202 and 204 have a radiation detection face 210 that is directed towards, for example, the patient 206. The detection face 210 of the gamma cameras 202 and 204 may be covered by a collimator 212. The collimator 212 may have different shapes and configurations.

The system 200 also includes a controller unit 214 to control the movement and positioning of the patient table 208, the gantry 207 and/or the gamma cameras 202 and 204 with respect to each other to position the desired anatomy of the patient 206 within the field of views (FOVs) of the gamma cameras 202 and 204 prior to acquiring an image of the anatomy of interest, such as the planar NM images 90 and 92 (shown in FIG. 4). The controller unit 214 may include a table controller 216, a gantry motor controller 218 and an X-ray tube controller 219 that may be automatically commanded by a processing unit 220, manually controlled by an operator, or a combination thereof. The gantry motor controller 218 may move the gamma cameras 202 and 204 with respect to the patient 206 individually, in segments or simultaneously in a fixed relationship to one another. The table controller 216 may move the patient table 208 to position the patient 206 relative to the FOV of the gamma cameras 202 and 204. The X-ray tube controller 219 may move the X-ray tube 209 and X-ray detector 211 individually, in segments or simultaneously in a fixed relationship to one another. In one embodiment, the gamma cameras 202 and 204 remain stationary after being initially positioned, and imaging data is acquired and processed as discussed below. The imaging data may be combined and reconstructed into a composite image, which may comprise two-dimensional (2D) images, a three-dimensional (3D) volume or a 3D volume over time (4D).

A Data Acquisition System (DAS) 222 receives analog and/or digital electrical signal data produced by the gamma cameras 202 and 204 and decodes the data for subsequent processing. An image reconstruction processor, which may form part of the processing unit 220, receives the data from the DAS 222 and reconstructs an image of the patient 206. A data storage device 224 may be provided to store data from the DAS 222 or reconstructed image data. An input device 226 (e.g., user console) also may be provided to receive user inputs and a display 228 may be provided to display reconstructed images.

In operation, the patient 206 may be injected with a radiopharmaceutical. A radiopharmaceutical is a substance that emits photons at one or more energy levels. While moving through the patient's blood stream, the radiopharmaceutical becomes concentrated in an organ to be imaged. By measuring the intensity of the photons emitted from the organ, organ characteristics, including irregularities, can be identified. The image reconstruction processor receives the signals and digitally stores corresponding information as an M by N array of pixels. The values of M and N may be, for example 64 or 128 pixels across the two dimensions of the image. Together the array of pixel information is used by the image reconstruction processor to form emission images. The processing unit 220 may also include the ROI localizing module 20 to perform ROI localizing as described herein in accordance with various embodiments.

The various embodiments and/or components, for example, the modules, or components and controllers therein, also may be implemented as part of one or more computers or processors. The computer or processor may include a computing device, an input device, a display unit and an interface, for example, for accessing the Internet. The computer or processor may include a microprocessor. The microprocessor may be connected to a communication bus. The computer or processor may also include a memory. The memory may include Random Access Memory (RAM) and Read Only Memory (ROM). The computer or processor further may include a storage device, which may be a hard disk drive or a removable storage drive such as an optical disk drive, solid state disk drive (e.g., flash RAM), and the like. The storage device may also be other similar means for loading computer programs or other instructions into the computer or processor.

As used herein, the term "computer" or "module" may include any processor-based or microprocessor-based system including systems using microcontrollers, Reduced Instruction Set Computers (RISC), Application Specific Integrated Circuits (ASICs), logic circuits, and any other circuit or processor capable of executing the functions described herein. The above examples are exemplary only, and are thus not intended to limit in any way the definition and/or meaning of the term "computer".

The computer or processor executes a set of instructions that are stored in one or more storage elements, in order to process input data. The storage elements may also store data or other information as desired or needed. The storage element may be in the form of an information source or a physical memory element within a processing machine.

The set of instructions may include various commands that instruct the computer or processor as a processing machine to perform specific operations such as the methods and processes of the various embodiments. The set of instructions may be in the form of a software program, which may form part of a tangible non-transitory computer readable medium or media. The software may be in various forms such as system software or application software. Further, the software may be in the form of a collection of separate programs or modules, a program module within a larger program or a portion of a program module. The software also may include modular programming in the form of object-oriented programming. The processing of input data by the processing machine may be in response to operator commands, or in response to results of previous processing, or in response to a request made by another processing machine.

As used herein, the terms "software" and "firmware" are interchangeable, and include any computer program stored in memory for execution by a computer, including RAM memory, ROM memory, EPROM memory, EEPROM memory, and non-volatile RAM (NVRAM) memory. The above memory types are exemplary only, and are thus not limiting as to the types of memory usable for storage of a computer program.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments without departing from the scope thereof. While the dimensions and types of materials described herein are intended to define the parameters of the various embodiments, they are by no means limiting and are merely exemplary. Many other embodiments will be apparent to those of skill in the art upon reviewing the above description. The scope of the various embodiments should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

This written description uses examples to disclose the various embodiments, including the best mode, and also to enable any person skilled in the art to practice the various embodiments, including making and using any devices or systems and performing any incorporated methods. The patentable scope of the various embodiments is defined by the claims, and may include other examples that occur to those skilled in the art. Such other examples are intended to be within the scope of the claims if the examples have structural elements that do not differ from the literal language of the claims, or the examples include equivalent structural elements with insubstantial differences from the literal languages of the claims.

What is claimed is:

1. A method for locating a region of interest within a subject, the method comprising:
   acquiring planar nuclear medicine (NM) images of a subject from an NM system, the planar NM images including at least one identified region of interest;
   acquiring a three-dimensional (3D) x-ray Computed Tomography (CT) volume image of the subject from an x-ray CT system; and
   locating the at least one identified region of interest within the 3D CT volume image using the planar NM images, wherein locating the at least one identified region of interest comprises determining a two-dimensional location of the at least one identified region of interest and a brightness value of the at least one identified region of interest at the determined two-dimensional location in the planar NM images, calculating a brightness ratio, and determining, using a depth profile, a depth of the at least one identified region of interest within the subject using the brightness ratio.

2. The method of claim 1, wherein the depth profile is generated along a line in a 3D CT attenuation ratio map formed from a 3D NM attenuation map.

3. The method of claim 2, wherein the 3D NM attenuation map is generated by translating x-ray energy values from the 3D x-ray CT volume image to gamma energy values, wherein the NM planar images are registered with the 3D x-ray CT volume image.

4. The method of claim 2, wherein the 3D CT attenuation ratio map is generated by determining, image slice by image slice within the 3D x-ray CT volume image, integral values from points within the 3D NM attenuation map to front and back points of the image slices.

5. The method of claim 1, wherein the planar NM images comprise a single anterior NM image and a single posterior NM image.

6. The method of claim 1, wherein acquiring the planar NM images comprises using a Single Photon Emission Computed Tomography (SPECT) having gamma cameras in an H-mode of operation to acquire opposite views of the object.

7. The method of claim 6, wherein the NM images are acquired in less than 30 seconds.

8. The method of claim 1, wherein the brightness ratio is determined from the planar NM images and used to determine the depth of the at least one identified region of interest in a 3D attenuation ratio map formed from the 3D x-ray CT volume image and emission data from the planar NM images.

9. The method of claim 1, further comprising acquiring emission data in only two planes using a pair of Single Photon Emission Computed Tomography (SPECT) cameras, wherein the emission data is used to form the planar NM images.

10. The method of claim 1, wherein the 3D x-ray CT volume is acquired concurrently with the planar NM images, the acquisition of the 3D x-ray CT volume and the planar NM images being interleaved.

11. The method of claim 1, further comprising displaying an image slice from the 3D x-ray CT volume image with a location of the least one identified region of interest identified based on the locating.

12. A method comprising:
acquiring x-ray Computed Tomography (CT) data;
acquiring Nuclear Medicine (NM) data;
determining a ratio value of radioactivity at a region of interest using a pair of NM planar images generated from the NM data;
creating a three-dimensional (3D) CT attenuation ratio map using the x-ray CT data and the NM data;
deriving from the 3D CT attenuation ratio map a depth profile for a determined location of the region of interest from the NM planar images;
identifying a distance ratio within the depth profile using the ratio value; and
determining a depth of the region interest using the distance ratio.

13. The method of claim 12, further comprising localizing the region of interest based on location information from the NM planar images and the determined depth.

14. The method of claim 13, displaying on a CT image slice generated from the x-ray CT data a location of the region of interest based on the localizing.

15. The method of claim 12, wherein the NM planar images are acquired by a pair of Single Photon Emission Computed Tomography (SPECT) cameras in an H-mode of operation, and emission data used to form the NM planar image acquired in less than 30 seconds.

16. An imaging system comprising:
a Nuclear Medicine (NM) imaging modality unit configured to acquire planar NM images of a subject;
an x-ray Computed Tomography (CT) imaging modality unit configured to acquire a three-dimensional (3D) x-ray Computed Tomography (CT) volume image of the subject; and
a processor including a region of interest localizing module configured to locate a region of interest within the 3D CT volume image using the planar NM images, wherein the region of interest localizing module is configured to determine a two-dimensional location of the region of interest and a brightness value of the region of interest at the determined two-dimensional location in the planar NM images, and to calculate a ratio of the brightness values, the ratio of the brightness values used to determine a depth of the region of interest from a depth profile, wherein the depth profile is generated along a line in a 3D CT attenuation ratio map formed from a 3D NM attenuation map, the 3D NM attenuation map generated by translating x-ray energy values from the 3D x-ray CT volume image to gamma energy values, wherein the NM planar images are registered with the 3D x-ray CT volume image, and the 3D CT attenuation ratio map is generated by determining, image slice by image slice within the 3D x-ray CT volume image, integral values from points within the 3D NM attenuation map to front and back points of the image slices.

17. The imaging system of claim 16, wherein the NM imaging modality unit comprises a pair of Single Photon Emission Computed Tomography (SPECT) gamma cameras in an H-mode of operation to acquire opposite views of the object and the planar NM images comprise a single anterior NM image and a single posterior NM image acquired using the pair of SPECT gamma cameras.

18. The imaging system of claim 17, wherein the NM images are acquired in less than 30 seconds.

* * * * *